UNITED STATES PATENT OFFICE.

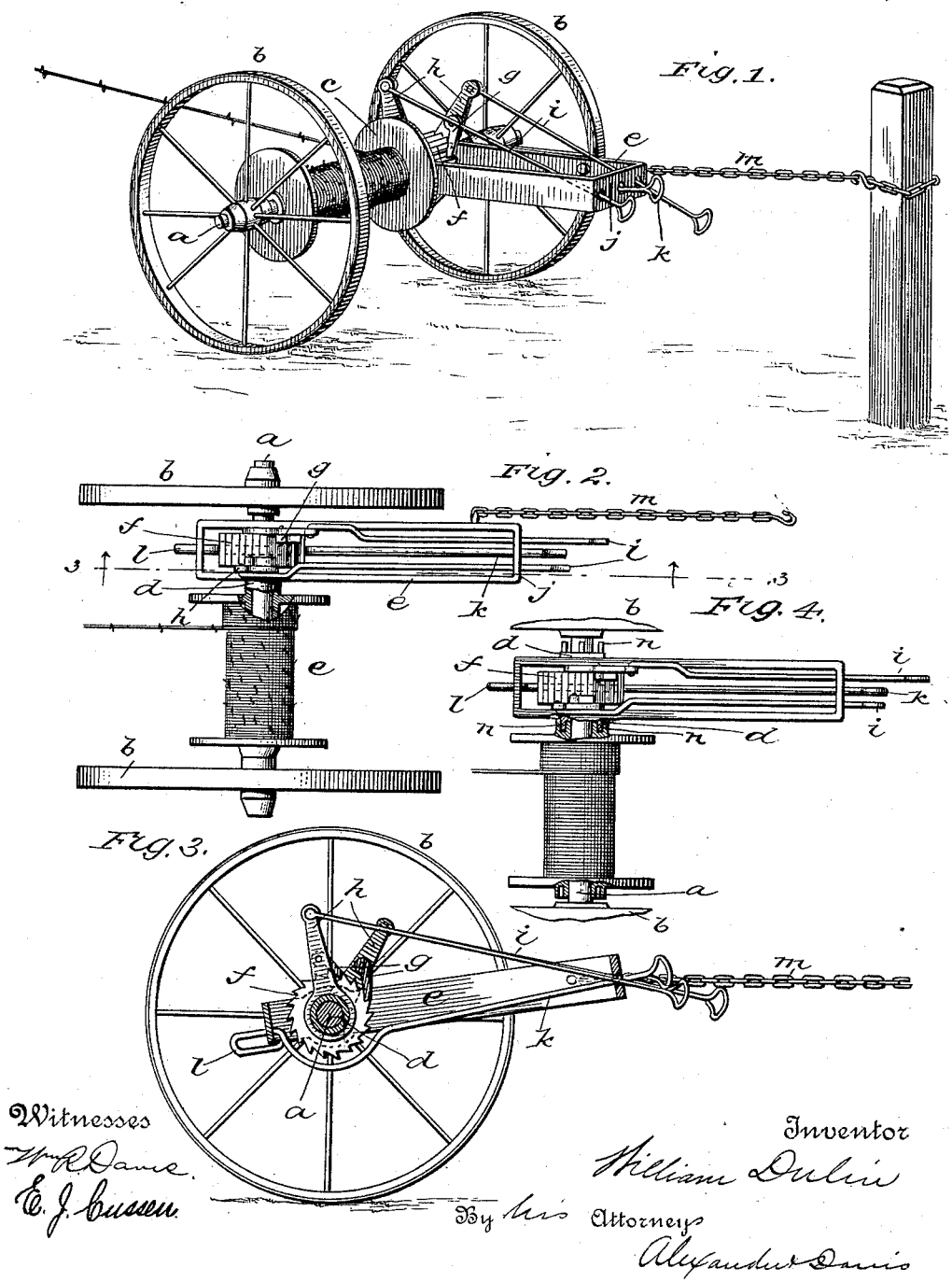

WILLIAM DULIN, OF AVOCA, IOWA.

FENCE-WIRE REEL AND TIGHTENER.

SPECIFICATION forming part of Letters Patent No. 467,499, dated January 26, 1892.

Application filed August 3, 1891. Serial No. 401,476. (No model.)

*To all whom it may concern:*

Be it known that I, WILLIAM DULIN, a citizen of the United States, residing at Avoca, in the county of Pottawattamie and State of Iowa, have invented certain new and useful Improvements in Fence-Wire Reels and Tighteners, of which the following is a specification, reference being had therein to the accompanying drawings.

This invention relates to a new and improved fence-wire reel and tightener, and has for its objects to provide a device of simple construction, which will be easy of manipulation, and which may be readily mounted on the axle of an ordinary wheeled farming implement, such, for instance, as a corn-plow.

The invention consists in certain combinations and arrangements of parts, as will be more fully hereinafter described, and particularly pointed out in the claims appended.

The invention will be readily understood and fully appreciated from the following, when taken in connection with the accompanying drawings, in which—

Figure 1 is a perspective view of my improved device in position for operation. Fig. 2 is a plan view, and Fig. 3 is a vertical sectional view taken on the line 3 3 of Fig. 2. Fig. 4 is a plan view of my machine, the wheels being broken away, showing a modification.

Similar letters of reference indicate corresponding parts throughout the several views.

Mounted loosely on the axle $a$ are the wheels $b\ b$, which support the machine. Between the wheels $b\ b$ and adjacent to the hub of one of said wheels I loosely mount on the axle the reel or spool $c$ for holding the fence-wire. A sleeve $d$, which loosely fits the axle, extends from one side of the reel $c$ and has mounted thereon a frame $e$, which carries the operating mechanism. On the sleeve $d$ or tubular extension of the reel between the side bars of the frame $e$ is rigidly secured a ratchet-wheel $f$, which is operated by pawls $g\ g$, pivoted above the said wheel on arms $h\ h$, which are loosely mounted on the sleeve $d$, one on each side of the ratchet-wheel between it and the side bars of the frame $e$. To the upper ends of the arms $h\ h$ are pivoted operating-rods $i\ i$, which extend rearwardly through the rear cross-bar $j$ of the rectangular frame $e$, and are formed at their ends into loops or handles, by which they are operated.

I provide a brake to be used when unreeling the wire, which consists of a bar or rod $k$, having an elongated loop $l$ in its forward end, the upper bar of said loop passing through the forward cross-bar of the frame $e$ in the center of the same near its lower edge. The bar is curved to pass under the ratchet-wheel, and is extended rearwardly and passes through the rear cross-bar of the frame, and is provided at its rear end with a handle for operating it.

In operation the brake-bar is pulled rearwardly, causing the forward curved portion to bear on the periphery of the ratchet-wheel, thereby retarding or stopping the rotation of the reel or spool. The loop in its forward end permits the endwise movement of the bar. To any convenient point on the frame $e$, preferably to one side, as shown, I secure a chain $m$, which, when the machine is used for tightening wire previous to stapling it to the fence-posts, is passed around a post, as shown, to hold the machine securely against the strain. Instead of using the chain for holding the machine against the strain of tightening the wires I may place one of the wheels or the hub of one of the wheels against the post. In the operation of tightening the fence-wires previous to stapling them to the fence-post the wire is secured to the reel in any suitable manner, and the chain is secured to the fence-post to hold the machine against the strain and also to support the frame $e$ at a convenient height for operating. The handles of the operating-bars $i$ are grasped and worked alternately forward and backward, operating through the pawls and ratchet-wheel to revolve the reel in the required direction for taking up the slack of the wire. It will be readily understood that by operating the levers alternately forward and backward one pawl is always in engagement with the ratchet-wheel, thereby preventing the revolving of the reel by the strain of the wire and the consequent unwinding of the wire from the reel at any time during the manipulation of the operating-bars $i$. In the operation of stringing the wires from one fence-post to another the pawls are thrown out of engagement with the ratchet-wheel and the handle of the brake-bar is grasped and the machine transported by pulling on the said bar. The curved portion of the said bar, bearing on the periphery of the ratchet-wheel, acts as a friction-brake to the reel, permitting it to revolve under a tension, and thereby stretching the wires as they are strung from one fence-post to another.

From the foregoing it will be readily seen that my invention possesses important advantages. It is of simple construction and operation and may be readily mounted on the wheels of any wheeled farming implement, and is a very efficient machine for the purpose described.

Instead of securing the sleeve $d$ rigidly to the reel, as shown in Fig. 3, I may make it detachable, as shown in Fig. 4. The sleeve $d$ carries the ratchet-wheel and the frame $e$, as before described, and is provided at its ends with projections or pins $n$, which extend beyond the side bars of the frame $e$, those on the inner end of the sleeve entering corresponding recesses in an adjacent part of the reel. Both hubs of the reel being provided with said recesses, it will be readily understood that the operating mechanism may be placed at either side of the reel, as the operator may desire.

Having thus fully described my invention, what I claim, and desire to secure by Letters Patent, is—

1. A fence-wire reel and tightener consisting of a reel adapted to fit loosely on an axle, a sleeve secured to said reel fitting loosely on the axle, a ratchet-wheel secured on said sleeve, a frame embracing said ratchet and loosely mounted on the sleeve, upwardly-extending arms fitting loosely on said sleeve, pawls pivoted to the said arms and normally engaging the ratchet-wheel, and operating-rods secured to said arms and supported by the frame, in combination with the axle and a pair of wheels mounted on said axle, substantially as and for the purpose described.

2. In a fence-wire reel and tightener, the combination of an axle, a pair of wheels mounted thereon, a reel loosely mounted on said axle, a sleeve secured to said reel and loosely fitting the axle, a ratchet-wheel secured on said sleeve, arms carrying pawls operating on said ratchet loosely mounted on said sleeve, a frame embracing said arms and ratchet loosely mounted on said sleeve, operating-bars secured to the upper ends of the pawl-carrying arms, a brake-bar secured to the rectangular frame and adapted to bear on the periphery of the ratchet-wheel, and a chain for securing the machine against any strain, substantially as set forth.

3. The combination of an axle and transporting-wheels, a reel mounted on said axle and carrying a wheel at one end, a frame mounted on the axle, and a rod mounted on said frame so as to have a limited movement thereon and provided with a bend in its forward end to bear against the periphery of said wheel when the rod is drawn rearwardly, as and for the purpose described.

In testimony whereof I affix my signature in presence of two witnesses.

WILLIAM DULIN.

Witnesses:
B. B. HUDSON,
G. J. MOREAU.